Feb. 8, 1966 G. BRUST ET AL 3,234,511

CENTERING METHOD FOR THE AUTOMATIC CHARACTER RECOGNITION

Filed Jan. 26, 1960 4 Sheets-Sheet 1

INVENTORS
GERHARD BRUST
AND WALTER DIETRICH
BY

Attorney

INVENTORS
GERHARD BRUST
AND WALTER DIETRICH
BY
Robert Harding Jr.
Attorney

INVENTORS
GERHARD BRUST
AND WALTER DIETRICH
BY

Attorney

INVENTORS
GERHARD BRUST
AND WALTER DIETRICH
BY
ATTORNEY

United States Patent Office 3,234,511

Patented Feb. 8, 1966

3,234,511
CENTERING METHOD FOR THE AUTOMATIC CHARACTER RECOGNITION

Gerhard Brust, Poppenweiler, Ludwigsburg, and Walter Dietrich, Ditzingen, Leonberg, Germany, assignors to International Standard Electric Corporation, New York, N.Y., a corporation of Delaware Filed Jan. 26, 1960, Ser. No. 4,777
Claims priority, application Germany, Feb. 5, 1959, St 14,739
5 Claims. (Cl. 340—146.3)

The invention relates to the automatic recognition of characters, such as written characters, in particular to a method of centering the characters prior to the actual recognition. In a number of known or proposed recognition methods the character fields are scanned in raster-fashion by a point source of light. The scanning signals, produced thereby, are stored in their entirety for evaluation after the complete scanning of one character field. Normally the scanning of one character is terminated when no further black portions are detected in the last column scanned.

If the base carrying the character is soiled—in this case "soiled" is the collective term for soiled paper, blurred ink of the ink ribbon, poor printing of the character due to soiled types of the printer or typewriter, and for unclear edges of the characters on the paper due to the woven fabric of the ink ribbon, or due to excessively hard striking of the typewriter keys—then the character is usually thickened, but still remains identifiable. In unfavourable cases, however, it is likely that the characters will run into one another or account of the soiling, so that the scanning of one character will continuously pass into that of the next character, because blurred black portions occur in each column scanned. Because of this the criterion indicating the end of one character and the beginning of the next is lost.

The object of the present invention is to provide a method by which two characters, joined by a blackened portion due to soiling, can be separated.

The method according to the invention is characterized in this, that the minimum of the blackening between two characters is determined, and is then evaluated as the separating point between two characters.

In the case of a two-dimensional storage device, that is, a storage device whose cells are arranged in raster fashion in accordance with the character field, it is expedient to determine within two particular adjacent columns the number of those cells which have stored the black values, to compare the resulting numbers with each other and to release an "end-of-character" signal whenever the greater number has been ascertained in the last, i.e. right-hand column.

To prevent the following character, in which it is also possible that the blackening may increase from left to right, from releasing the end-of-character signal, it is advisable to suppress the signal-release during the time taken for one character to pass through the respective columns.

If the minimum of the blackening cannot be determined without ambiguity, because the beginning of the following character shows the same amount of blackening as the soiled portion—this is the case for example with respect to numerals 1 and 7, when the blurred portion between two characters starts exactly at the begining of the character (see FIG. 5*a*)—then it is an advantage to use an additional method which is based on the fact that each character is constituted by a continuous line, in other words, the blackening of one character is not interrupted. Since each character is two-dimensional, in each character two neighbouring columns are blackened at some point. In addition to the minimum of blackening in two particular adjacent lines, a test is now made whether at least two adjacent cells of these columns have simultaneously stored the black value, and an end-of-character signal is released if this is not the case.

A storage device, which can be advantageously used for carrying out the method, is characterized by the fact, that a one-dimensional shift register is divided into the same number of sections as there are columns or lines in a character field, with the individual sections having the same number of stages as there are lines or columns in the character field, and that successive sections are assigned to adjacent columns, and the stages within the sections are assigned to corresponding lines within the character field.

In certain circumstances it may also be necessary to enlarge the storage device by a number of sections according to the problem set, but to assign the same stage to the same line.

In the following, the invention will now be particularly described by way of example with reference to FIGS. 1–6, in which.

Figure 1:
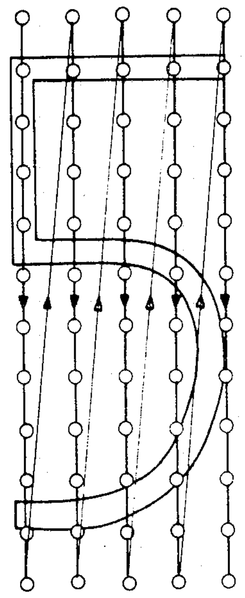
FIG. 1 shows the character field subdivided in raster fashion.
Figure 2:
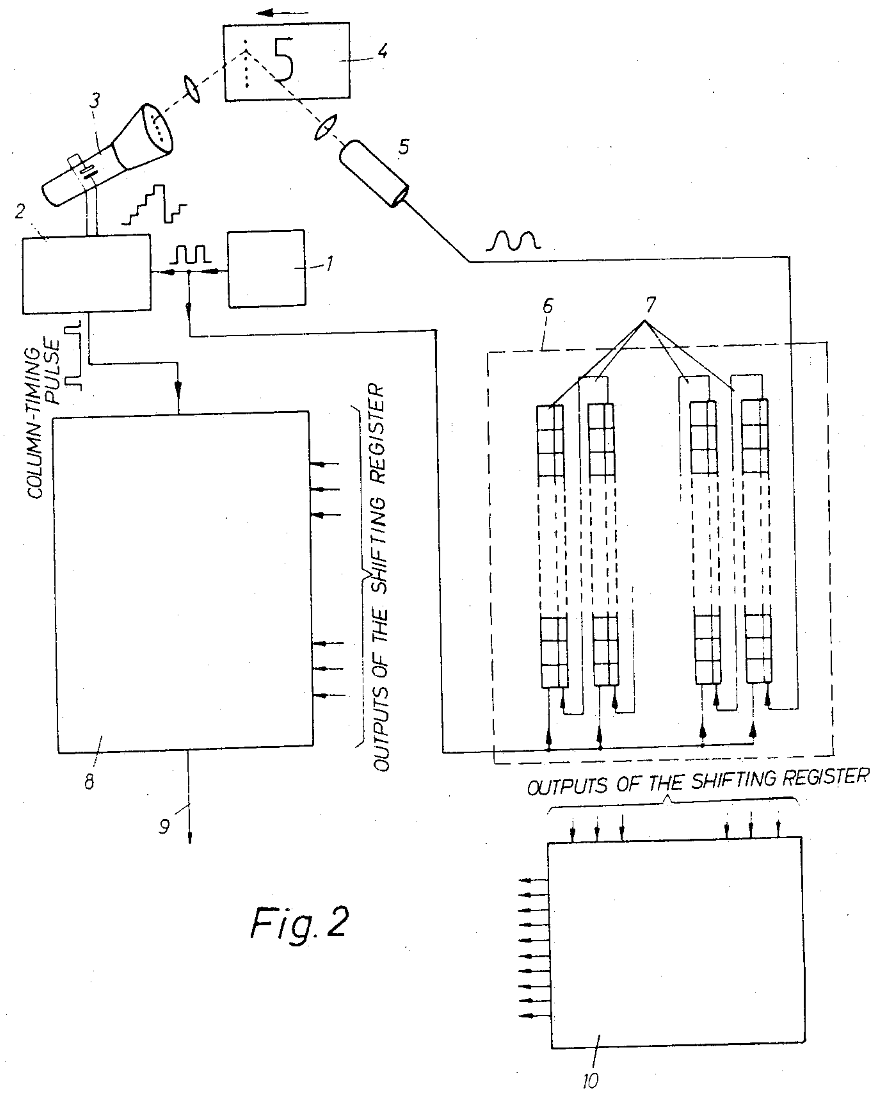
FIG. 2 shows a block diagram of a character-recognition device, in particular the one-dimensional shift register for carrying out the centering method according to the invention.

According to FIG. 2, the scanning can be carried out by a "flying spot," similar to that used in television. A clock-pulse generator 1 synchronises a step or sawtooth voltage from the sawtooth generator 2 which is applied to the vertical plates of the cathode-ray tube 3, and deflects the light spot in the vertical direction. The character base 4 is simultaneously moved along at a constant speed, which is in a fixed relation to the clock-pulse frequency, in the horizontal direction (arrow). The superposition of this movement of the carrier base on the movement of the projection of the light spot on to the base results in a column-wise scanning of the character (FIG. 1). When it strikes the figures and the paper base the reflection of the light spot varies in strength. The returned light is then measured in the photo-multiplier 5 and stored in the register 6 as a "black" or a "white" value under control of the corresponding clock pulse.

The "flying spot" scanning method described is only one of various possibilties. Fundamentally any type of scanning can be used which allows the character to be serially fed column-wise into the register. In this connection it is also possible to employ a scanning method in which the scanning is effected by a row of photocells followed by a parallel-series conversion.

The unidimensional shift register 6 is divided into sections 7, and these sections, at least with respect to their functions relating to their assignment to the columns of the character field, are arranged in adjacent columns. Each section contains the same number of stages, and identical stages within the individual sections are assigned to the same line of the character field. The information is now fed through all the columns in the same direction. In other words, during the transition from one column to another one, it jumps from the last (top) stage of one column to the first (bottom) stage of the next column to the left. On account of the coincidence between the number of points per column and the number of stages of the sections, the stored character appears, true-to-shape as a mosaic-type pattern in the register. By each clock impulse the stored character is shifted upwards by one line, the information of the top line being shifted with each clock pulse by one column and transferred to the bottom line.

The principle of the centering method is shown in FIG. 2. A character can only be centered by the device if the latter is supplied with a criterion indicating that a character has actually been stored; the device must also be capable of determining some sort of limitation of the character (for example, beginning, end, centre point, height, etc.), which acts as a criterion as to whether or not the character has been centered.

If, for example, the left-hand and the upper edge of the character are used as the criterion for the centering, the character can be shifted in a shift register according to FIG. 2, until the left-hand edge of the character has reached, for example, the first or left hand column, and until the upper edge of the character has reached, for example, the first line of the shift register. These conditions are checked by the logical centering circuit 8, consisting of known coincidence circuits; and, as soon as the conditions are satisfied, the "completed centering" signal is released from the output 9, causing the recognizing circuit to be connected to the register, or released therefrom.

It will now be easily understood that a character can no longer be correctly centered if the character, or its edges are soiled (blurred). In such a case the device cannot distinguish between the character and the smear as the latter is also scanned at the same time and in many cases stored as "black value," so that in such cases the soiled or blurred portion will be evaluated as a criterion that centering has been effected, and the actual character is then not in the proper position of the shift register.

The basic principle of a centering method which may be termed "recentering method," is already known.

According to this principal, a character is only indicated at the output of the reading analyser as being correctly recognized if it has been centered, and at the same time recognized as one of the given characters by the recognizing circuit 10. The logical circuit 10 is connected with that part of the shifting register in which the correctly centered character is stored. Accordingly, a character which is incorrectly centered because of the soiling, will not be recognized by the logical circuit.

Figure 3:
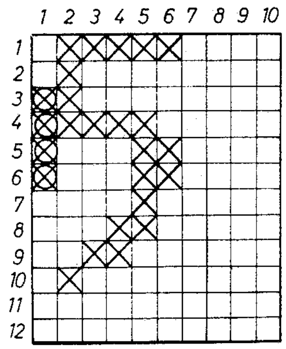
FIGS. 3, 4*a*, 4*b*, 5*a* and 5*b* show two blurred figures which have run into each other.

Let us assume that a character, for example a "5," is incorrectly centered on account of the soiled or blurred portion in its left-hand edge, as shown in FIG. 3. The drawing schematically represents the shift register 6; each of the small squares represents one register element, for example, a flip-flop. In this case the register is assumed to consist of ten vertical columns and twelve horizontal lines. It is assumed that each of the white squares indicating a flip-flop carries the scanned information "white," while each flip-flop indicated by the crossed square carries the information "black." The additionally encircled crosses indicate the soiled or blurred portions.

The configuration (according to FIG. 3) is indicated as being centered, but is not recognized by the logic circuit (because it is incorrectly centered). These two facts are received by a suitable coincidence circuit, and the corresponding signal is used to shift the entire information item in the register one column to the left.

The recentering has only been described with respect to one column by way of example. It may equally well be effected by one line upwards, and then by another column towards the left, etc. The soiled or blurred portions within a character are not considered in this particular case, and are eliminated by different means (regulation).

Figure 4A:
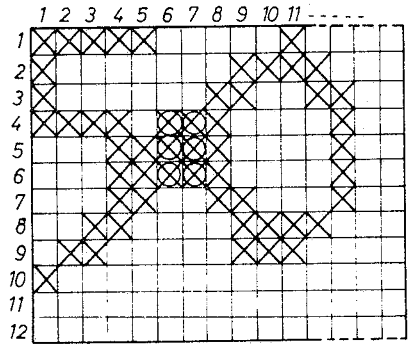

FIG. 4*a* shows the numeral "50." The numeral "5" is assumed to have been correctly centered and recognized. The information will then be shifted normally in the shift register, and the figure "0" cannot be centered, because the device cannot determine the beginning of this figure due to the soiling, which is again denoted by the encircled crosses.

This now is the beginning of the invention. It is possible to measure the beginning of the character at a suitable point which, in the exemplified representation of FIG. 4*a*, would be the seventh and eighth columns, by determining whether in the eighth column there are more black-informations (that is, more crosses) than in the seventh column, and if so, this fact is stored and used to effect the "completed centering" signal, as soon as the numeral "0" has reached the first column in the course of the normal shifting through the register. In the connection it would be possible to speak of a "difference method" and of a "difference circuit."

The difference method alone may be inadequate, see FIG. 5*a*, because the black-information, again starting from the seventh column, is not increased in the following columns. Only the eleventh column shows five "black" points. Accordingly, only this column is evaluated by the device as being the beginning of the numeral "7," in other words, the numeral "7" is only reported as being centered after the information of the eleventh column has been shifted to the first column. This would cause it to be incorrectly centered and it would not be recognized.

Figure 5A:
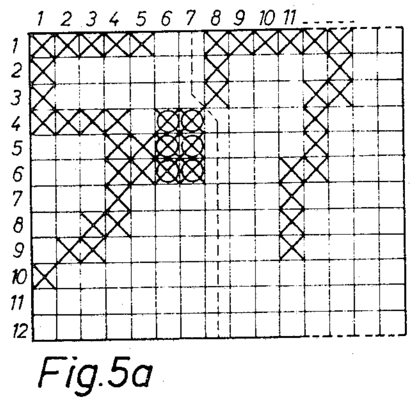
Figure 5B:
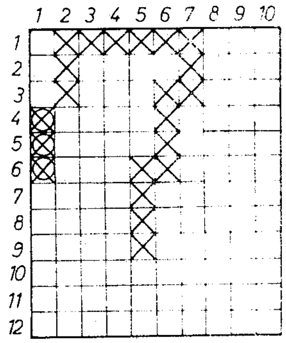

For cases of this kind it is also possible to employ a method which is designated as the "zig-zag method." When this method is used, a check is made, for example, again in the seventh and eighth columns, whether at least one of the corresponding two adjacent flip-flops on each line indicates the value "white." In FIG. 5*a* this is the case along the dotted line. This fact is then stored again and used for releasing the "centered-character" signal, as soon as the figure "7" has reached the first column in the course of its normal passage through the register.

Since all three methods, namely the recentering method, the difference method and the zig-zag method can operate in parallel, it is sufficient, for the purpose of centering, for only one of them to show a result. If there is considerable blurring it may happen that none of the circuits responds.

In that case a counter may be provided which releases an alarm signal if one black-information is substantially broader than a figure, and no centering pulse had been released while this information was passing through the register. This method is already known. It only delivers a signal for stopping the reading analyser and, consequently, for checking any human error, while the three aforementioned methods make an automatic recognition of the character possible without interrupting the operation of the reading analyser.

Figure 6:
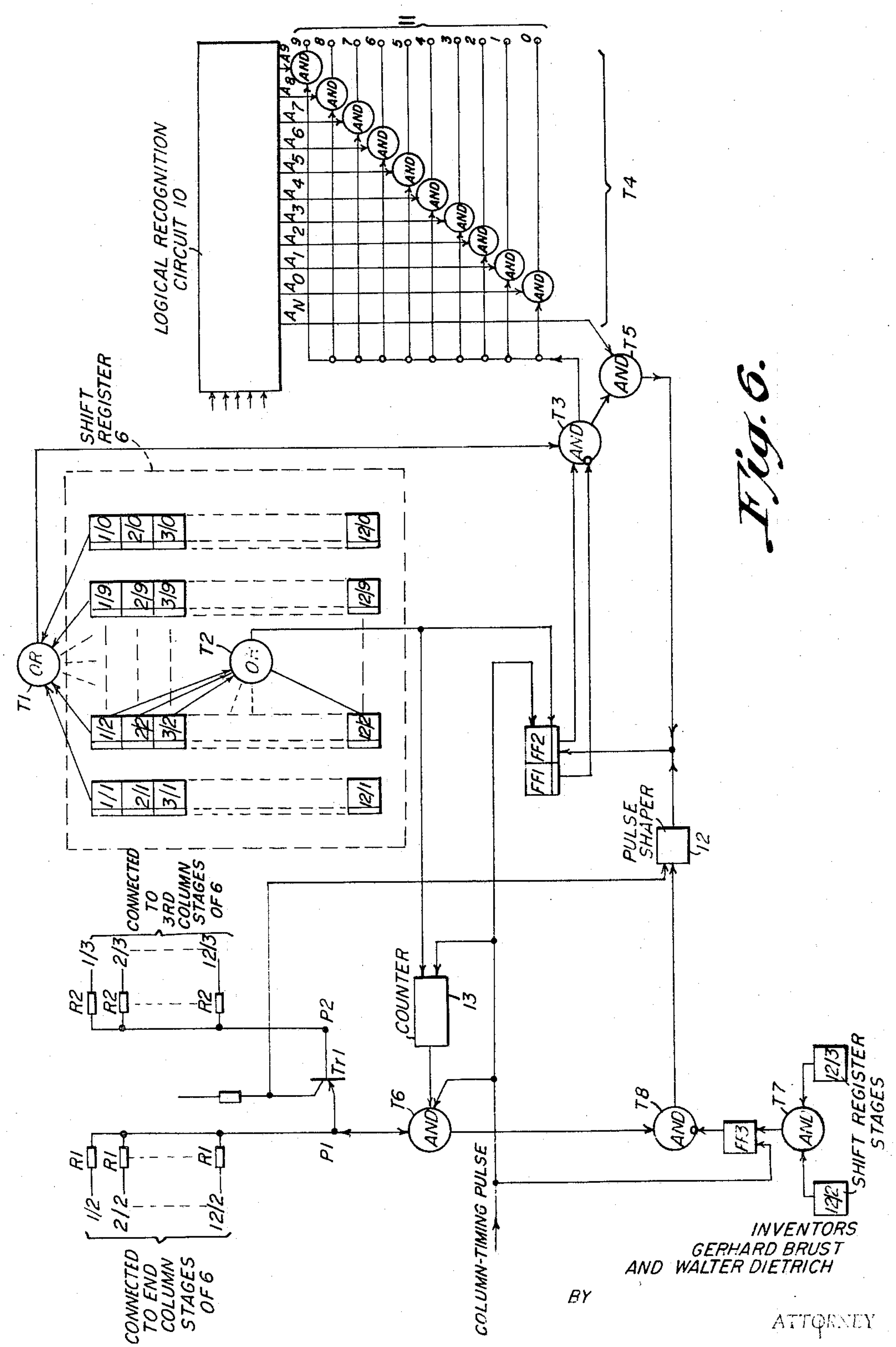
FIG. 6 shows the basic circuit diagram of a device for carrying out the method according to the invention.

FIG. 6, by way of example, shows schematically an overall circuit for carrying out the method according to the invention for effecting the recognition, comprising the shift register 6, the logical recognition circuit 10, and the circuit arrangement necessary for the centering.

First of all, however, the normal centering operation will be described, that is, the centering of characters which are not soiled or blurred. The shift register is assumed to comprise twelve lines and ten columns. The designation of the individual stages of the register is for example 2/1, which means second line, first column. All the stages of the first line are connected to the OR-gate T1 which delivers a signal as soon and as long as one or more stages of the first line carries a black-information. Similarly all the stages of the second column are connected with the OR-gate T2, providing a "black"-signal as soon and as long as one or more stages of the second column carries a black-information. The OR-gate T2 has its output connected as a bias input to a flip-flop FF2 which can be shifted from a "white" condition to a "black" condition only if the bias is present from OR-gate T2 when a column-timing pulse is received.

Therefore the "black" signals produced during the stepping of the informations into the column do not cause the setting of the flip-flop FF2 to the "black" condition, but if any "black" informations exist when the column is filled, then the "black"-information is stored in the flip-flop FF2 by the next column-timing pulse. Accordingly, the flip-flop FF2 carries the information "one or more stages in the second column are carrying a black-information of the scanned character." Similarly the flip-flop FF2 is reset again to "white" by the column-timing pulse as soon as the second column carries only white-information and the bias from the OR-gate T2 is thus removed, in other words, if white paper has been scanned. The flip-flop FF2 is coupled to the flip-flop FF1 also like a shift register, so that the flip-flop FF1 receives the information from the flip-flop FF2 with the next column-timing pulse.

In this way both the flip-flops FF1 and FF2 indicate whether the first two columns carry only white-information, or whether they also carry black-information, because between column-timing pulses the entire information in the shift register is shifted one column to the left.

This method has the advantage that the information distribution can be determined in the shift register without the necessity to connect all the stages concerned. This is particularly important if the entire shift register is to be supervised in this way.

If now a new character in the shift register is advanced to the second column, then the flip-flop FF2 also indicates "black," while the flip-flop FF1 is still indicating "white," because the character has not yet reached the first column. This position of the two flip-flops is used as a criterion for the horizontal centering of the character; the vertical centering, as already mentioned, is indicated by the gate T1. The character is centered if the second column indicates "black," if the first column indicates "white," and if the first line indicates "black." These three conditions are connected with each other by the AND-gate T3, at the output of which the centering pulse appears as a signal indicating completed centering.

The recognition circuit 10 has ten outputs A0 to A9, one for each character to be recognized, and each output is connected to its individual AND gate T4. Any one of these AND gates which operates to produce a signal on its output 11 will indicate that its particular character has been recognized. All the AND gates T4 have a second input which is connected to the output of AND gate T3, and hence no AND gate T4 can produce an output unless the gate T3 is operated, or, in other words, unless the character has been centered.

The recognition circuit 10 also has another output AN which is energized when no recognition has occurred or when more than one output A0 to A9 is energized.

If now a centered signal is not recognized by the logical circuit, then there is no signal at the output 11 because all the T4 gates are blocked, but this fact is evaluated by the AND-gate T5 which has one output connected to T3 and the other to the output AN from the recognition circuit 10 and tranfers a signal to the flip-flop FF2, which is thereby set to "white" (being previously set to "black" as a prerequisite for the centering). The next successive column-timing pulse resets the flip-flop FF2 to "black," because the second column still contains black-information of the character but the "white" condition is transferred to the flip-flop FF1. In the meantime, however, the character has moved one column to the left, i.e. to the first column, and is now reported again as being centered, because the three centering conditions (FF1 "white," FF2 "black," T1 "black") are again fulfilled.

Accordingly, this "recentering" of the information which has been moved one column to the left, is effected without the information itself being changed in any way. Similarly, this recentering can be carried out in the vertical direction.

From the above description it will be seen that if T3 has passed a signal, indicating that a character has been centered, either the AND gate T5 or one of the AND gates T4 will become effective. One of the AND gates T4 will become effective if the recognition circuit produces the indication "properly recognized," while the AND gate T5 will become effective if the recognition circuit produces the indication "not recognized" on the output AN.

As shown in FIG. 6, in order to carry out the difference method, it is necessary to provide as many resistors R1 as there are lines in the shift register (twelve in the present example). The resistors are of equal value. Each stage of the second column of the shift register is connected to one end of a resistor; these connections have been omitted in the drawing for reasons of clarity. The other ends of all the resistors R1 are connected to the common point P1. In like manner the resistors R2 are connected to the stages of the third column, and are connected at their other ends to the point P2. The flip-flop stages of the shift register are assumed to indicate 0 volts at the output which is connected to the resistors if they carry the information "white," and to indicate the value −10 volts if they carry the information "black."

Figure 4B:
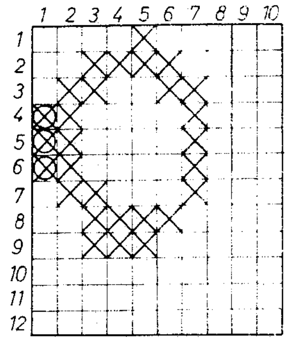

On account of the voltage addition effected by the resistors, the potential P2 will then become negative with respect to P1, as soon and as long as more stages are "black" in the third column than in the second column. This fact is evaluated with the aid of the transistor Tr1 which, then via the pulse shaper 12, resets the flip-flop FF2 to "white." The next column-timing pulse then sets the flip-flop FF2 to "black," and the flip-flop FF1 at the same time to "white." In this way the centering conditions have been met, and the numeral "0" of FIG. 4a is recorded as having been centered, if it is in the second column of the shift register, FIG. 4b. If the numeral "0" is not recognized by the logical circuit in this particular position, then, as already described, the recentering becomes effective, in other words, the numeral "0" is recentered if it has been shifted to the first column.

Accordingly, in this circuit the broad shift register according to FIGS. 4a and 5a is not required; this has only been assumed to provide a better understanding of the method. In order to prevent the difference circuit from becoming effective prematurely, for example, within a character, the counter 13 is provided. This which counts the number of successive periods of the column-timing pulse during which the second column of the shift register is carrying the black-information. Only after a number of periods corresponding to the normal width of the character, about five in the present example, does the counter 13 release the difference circuit via the gate T6. Finally, the gate T6 is only unblocked for the short period of the column-timing pulse, because only during this time is it ensured that the character has assumed the position in the shift register necessary for a difference measurement.

The condition for the operation of the difference circuit may also be worded differently, for example: the circuit arrangement becomes effective if, in the third column, fewer stages are "black" than in the second column (contrary to the previous case). Or alternatively: the circuit arrangement becomes effective if a minimum of "black" stages appears in one column, as compared with the neighboring columns. For this purpose only slight alteration of the circuit arrangement is required.

The operation of the "zig-zag" method will now be described.

For reasons of clarity, two stages of the shift registers are shown separately in the left-hand bottom part of FIG. 6, namely the stages 12/2 (twelfth line, second column)

and 12/3 (twelfth line, third column). These stages are led to the AND-gate T7, which gives a signal only if both stages are simultaneously "black." The signal sets the flip-flop FF3 in such a way that it blocks the AND-gate T8. Each column-timing pulse resets the flip-flop FF3 to its initial position, whereby the gate T8 is again unblocked, but still sends no output signal. Between successive column-timing pulses each pair of informations representing a line in columns 3 and 4 pass successively through the flip-flops 12/2 and 12/3 as they enter columns 2 and 3. Only after the gate T8 has been unblocked for one complete period of the column-timing pulse, in other words after the two stages 12/2 and 12/3 have not been simultaneously "black" for one complete period of the column-timing pulse, can the next column-timing pulse effect the setting of the flip-flop FF2 to "white" via the gate T6 and the now unblocked gate T8, as well as via the pulse shaper 12. Thus a signal through gate T8 can only be produced if one or the other, or both, of the adjacent informations in the two columns are "white." This "zig-zag" method, like the difference method, then leads to the centering of the character. For reasons already mentioned with respect to the difference circuit, the zig-zag circuit is also released by the couner 13, and only for the period of one column-timing pulse.

The circuit thus determines whether or not adjacent stages in the second and third column had been simultaneously "black" for one complete period of the column-timing pulse. If so, nothing happens; if not, then the character is centered in the manner hereinbefore described, and recognition is then made possible.

The numeral "7" according to FIG. *5a* is centered by the zig-zag circuit shown in FIG. *5b*. If the figure is not recognized in this position, it is recentered by being shifted one column to the left.

A variation of the zig-zag circuit consists in using logical AND- or OR-circuits of the type known per se, by which the entire second column and the entire third column are simultaneously checked for their black-information. The centering process already described could also be developed from this test. A logical circuit of such a type, however, would require a much higher expenditure, which would increase the number of stages per column; furthermore the circuit arrangement would load all the stages of the two columns, which, in certain circumtances, might impair the efficiency of the shift register. As compared with this the proposed circuit arrangement is much less expensive and independent of the number of stages; moreover only one stage is loaded per column.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. In an automatic character recognition apparatus, means for scanning a field containing characters to be identified in a predetermined path which crosses a character a plurality of times, means connected to said scanning means for producing a signal whenever a black area is encountered by said scanning means, means for storing the signals produced by said last-mentioned means in a predetermined pattern corresponding to the arrangement of said black areas in said characters, means connected to said storing means for determining the minimum number of black areas in a particular region of said pattern, and means connected to said last-mentioned means for producing an "end-of-character" signal at the time said minimum number of black areas is determined.

2. In an automatic character recognition apparatus, the combination, as defined in claim 1, in which the scanning means scans the field in substantially parallel columns transverse to the line of the characters being scanned, and in which the particular region of the storing means comprises adjacent columns and the means for determining the minimum number of black areas comprises means for comparing successive pairs of columns.

3. In an automatic character recognition apparatus, the combination, as defined in claim 1, further comprising means responsive to the signal producing means for suppressing the "end-of-character" signal for a time required to scan a predetermined number of columns after a previous "end-of-character" signal has been produced.

4. In an automatic character recognition apparatus, the combination, as defined in claim 1, in which the scanning means scans the field in substantially parallel columns transverse to the line of the characters being scanned, further comprising means connected to the storing means for comparing the stored signals of two adjacent columns to determine whether or not at least two signals from adjacent areas, one in each column, represent black, and means connected to said comparing means for producing an "end-of-character" signal if this condition does not exist.

5. An automatic character recognition apparatus comprising scanning means for scanning elemental areas of successive characters to be recognized and producing signals representing black ones of said areas, storing means connected to said scanning means for storing said signals in a predetermined arrangement of columns and lines, said storing means being larger than would be required for one character, recognition means connected to said storing means and having an output for each character to be recognized and adapted to produce a recognition signal on a particular output when signals representing the character corresponding to said output are in a predetermined position in said storing device, an output circuit, gating means connected between said output circuit and said recognition means, means for opening said gating means to permit the recognition signal to pass to said output circuit when signals representing black areas appear simultaneously in the upper line and in a predetermined column of said storing means, means responsive to the absence of a recognition signal from said recognition means to test two predetermined columns of said storing means to determine which has less signals representing black areas than the other, means for causing said gating means to open if a predetermined one of the said two columns has less of said black signals, means for simultaneously comparing said two columns and for producing a control signal if any pair of linewise adjacent areas both have signals representing black, and means responsive to the absence of said control signal for opening said gating means.

References Cited by the Examiner

UNITED STATES PATENTS

| | | | |
|---|---|---|---|
| 2,932,006 | 4/1960 | Glauberman | 340—149 |
| 2,964,734 | 12/1960 | West | 340—149 |

OTHER REFERENCES

Publication: "Automatic Registration in High Speed Character Sensing Equipment," by Tersoff, Intelligent Machines Research Corporation, Alexandria, Va., December 1953, 18 pages.

MALCOLM A. MORRISON, *Primary Examiner.*

EVERETT R. REYNOLDS, NEIL C. READ, *Examiners.*